Jan. 22, 1957  K. M. FEIERTAG ET AL  2,778,965
DYNAMOELECTRIC MACHINE HOUSING ASSEMBLY
Filed Oct. 31, 1955
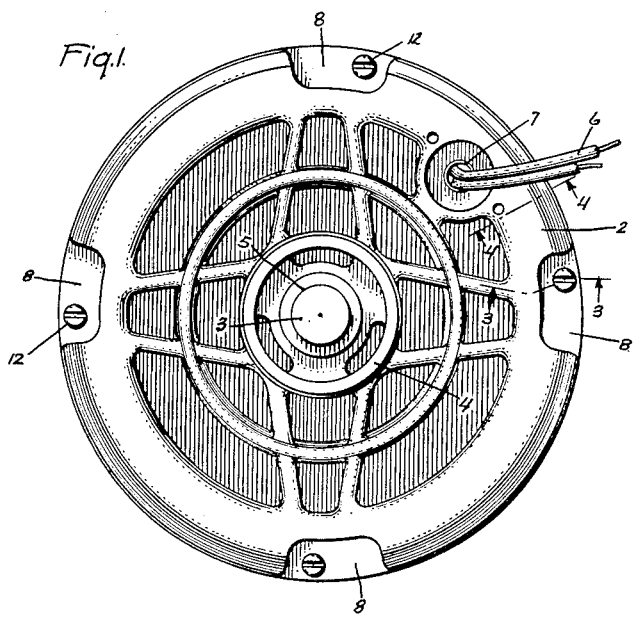
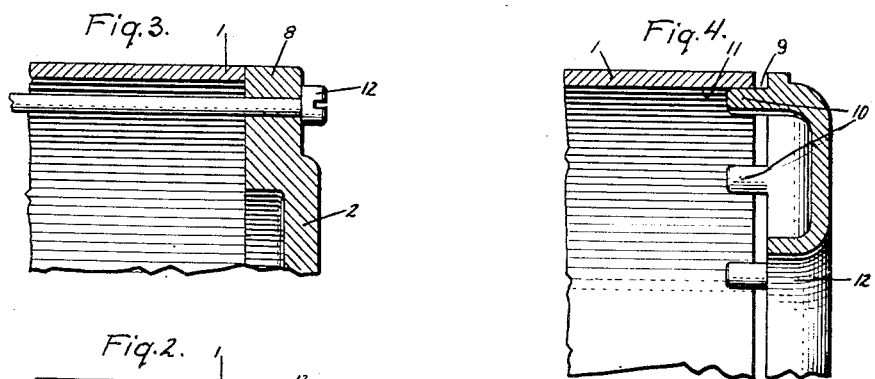
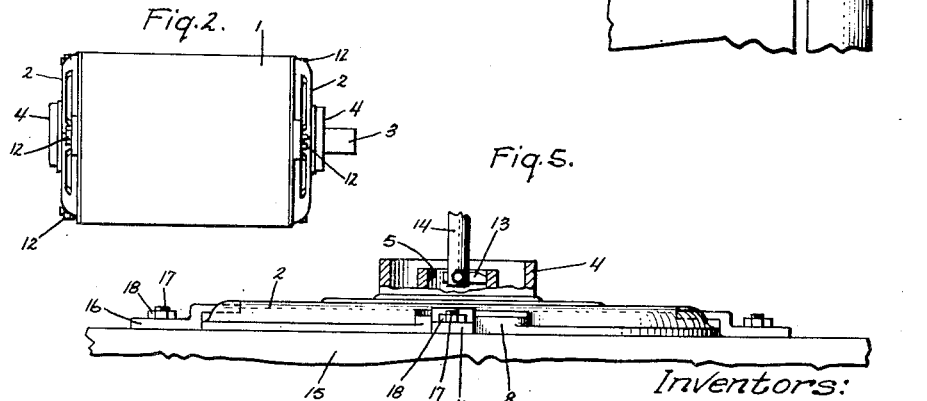
Inventors:
Karl M. Feiertag,
Lawrance W. Wightman,
by
Their Attorney.

United States Patent Office 2,778,965
Patented Jan. 22, 1957

2,778,965

DYNAMOELECTRIC MACHINE HOUSING ASSEMBLY

Karl M. Feiertag and Lawrance W. Wightman, Fort Wayne, Ind., assignors to General Electric Company, a corporation of New York Application October 31, 1955, Serial No. 543,757

5 Claims. (Cl. 310—254)

This invention relates to machine housing assemblies, and more particularly to a novel construction for the end flanges of such assemblies used to support the rotating part of a machine.

In the manufacture of machines having rotatable parts such as, for instance, dynamoelectric machines, there is generally provided a housing for the machine which includes a central housing member and a pair of closure members for each end thereof, generally called end flanges. Particularly with respect to small dynamoelectric machines, the bearing means for rotatably supporting the movable parts of the machine are normally formed in either one or both of the end flange members. In the usual construction, the stationary part of the machine is secured to the central housing member and the rotating part is supported by the end flange members. Since relatively close tolerances are required for the spacing between the rotatable and stationary parts of the machine, it will be seen that it becomes important that the end flange members be assembled in true predetermined relationship with respect to the housing member. To obtain true relationship of the end flanges and the housing with constancy has proved somewhat of a problem in the past due to the fact that the machining of the bearing opening in the end flange and the securing of the end flange to the housing member both have an inherent tendency to cause the end flange member to warp. This warp, when it occurs, deflects the machined bearing opening from the true axis of the machine and thus destroys the proper alignment thereof. It is most desirable to provide a structure which will be simple and economical while at the same time eliminating the results of the undesirable tendency to warp.

It is, therefore, an object of this invention to provide a machine housing structure which will include the advantageous features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In its broadest aspect, this invention provides a substantially tubular machine housing member, and an end flange member arranged in axial contact with an end of the housing member at a predetermined number of locations in excess of two. Means are provided at each of the locations for clamping the flange member to the housing member, and means are provided on the end flange member in radial contact with the housing member to provide for correct relative radial positioning of the members.

With this construction, the flange member may be clamped down at each of the predetermined locations during the machining of the bearing opening so as to simulate the clamping action which will occur when it is actually assembled to a housing member. This arrangement provides an effective and economical housing assembly which eliminates the undesirable consequences of the warping tendency by ensuring that the bearing opening will have the same true relationship to the remainder of the machine when assembled as when machined regardless of any warping occurring between the two.

In the drawing,

Figure 1 is an end view of a dynamoelectric machine housing including the advantageous features of this invention;

Figure 2 is a side view of the machine of Figure 1;

Figure 3 is an enlarged cross-sectional view along line 3—3 in Figure 1;

Figure 4 is an enlarged cross-sectional view along line 4—4 in Figure 1; and

Figure 5 is a side cross-sectional view of the improved end flange member of this invention during the machining of the bearing opening.

Referring now to Figures 1 through 4 of the drawing, there is shown a tubular housing member 1 whose ends are closed by a pair of end flange members 2 so as to form an enclosure for a dynamoelectric machine having a rotatable shaft member 3 rotatably supported in sleeve bearings 5 mounted in the hub portion 4 of each end flange 2. The machine of which shaft 3 is a part is not further shown, except for the provision of conductors 6 extending through opening 7 to supply power to the machine, inasmuch as the invention relates primarily to the housing assembly rather than to the machine proper.

Each end flange member 2 has a number of indented portions 8 spaced about its periphery. For reasons which will be explained below, the number of indented portions 8 is to exceed two, that is, it should be at least three but may be as many, within reason, as desired. Thus, in the embodiment depicted, four such indentations have been shown. Referring particularly to Figure 3, it will be seen that indented portions 8 of each end flange 2 are in axially abutting contact with the end of housing member 1.

Between the indented portions 8, the flange 2 is spaced from the axial end of housing member 1, as shown particularly in Figure 4 by the numeral 9. The end flange member 2 is radially located with respect to housing member 1 by means of a plurality of axially extending projections 10 which are in radial abutment with the inner surface 11 of housing member 1.

Each end flange member 2 is secured to the housing member 1 to form the machine enclosure by means of through-bolts 12 located at each of the indented portions 8. In this manner, axial clamping means are provided at each of the indented portions in axial contact with the end of housing member 1, and no clamping means is provided between the indented portions.

In order to provide a truly centered bearing opening in end flange member 2, a machining operation is performed on the bearing 5 by means of a tool such as 13 rotated on the axis of a member 14. During this operation, the end flange member 2 is seated on a surface 15 to which four clamp members 16 are secured by threaded means 17 and nuts 18. Each of the clamping members 16 is arranged to bear against the end flange member 2 at an indented portion 8, and nuts 18 are tightened a predetermined amount so as to simulate the effect of through-bolts 12 (which are also tightened a predetermined amount when assembled). In view of the fact that clamping members 16 are simulating the effect of through-bolts 12, the end flange member 2 is held against the surface 15 in the same manner that it will subsequently be held against the housing member 1. Because of this, the bearing opening 5 will have the same relationship to housing member 1 as it has during its formation to member 15. Since the opening is, of course, formed truly centered as an inherent function of the machining operation, the provision of structure which permits it to be maintained in that relationship when assembled will again ensure a truly centered opening. The undesirable effect of the inherent tendency of the end flange member 2 to warp is eliminated by forcing the end flange member into the same position during the bearing opening machining operation that it will have when assembled to the housing member 1.

This effect of warping can be eliminated with certainty in all cases only if the end flange member is secured with a predetermined force only at those places where it is in axial contact. In addition, a minimum of three such places is required in view of the fact that with either two or one, a pivoting motion of the end flange about the line or point is possible and makes positive re-creation of the same position of the end flange member practically impossible.

It will be seen from the foregoing that this invention provides an improved housing assembly construction by means of which the centering and alignment difficulties caused by the tendency of the end shield to warp are eliminated.

While this invention has been explained by describing a particular embodiment thereof, it will be apparent that improvements and modifications may be made without departing from the scope of the invention as defined in the appended claims.

What we claim as new and desire to secure by Letters Patent of the United States is:

1. A substantially tubular machine housing member, and an end flange member arranged in axial contact with an end of said housing member at a predetermined number of peripherally spaced locations in excess of two, said flange member being axially spaced from said housing member intermediate said locations, means at each of said locations axially clamping said flange member to said housing member with a predetermined force, and means on said flange member in radial contact with said housing member to cause correct relative radial positioning of said members.

2. A substantially tubular machine housing member, and an end flange member arranged in axial contact with an end of said housing member at a predetermined number of peripherally spaced location in excess of two, said flange member being axially spaced from said housing member intermediate said location, means at each of said locations axially clamping said flange member to said housing member with a predetermined force, and axially extending means on said flange member intermediate said locations in radial contact with said housing member to provide correct relative radial positioning of said members.

3. A substantially tubular machine housing member, and an end flange member having peripheral indentations provided at a predetermined number of peripherally spaced locations in excess of two, said flange member being axially spaced from said housing member intermediate said locations, each of said indentations forming a foot on the opposite side of said flange member, each said foot being in axial contact with an end of said housing member, means engageable with said flange member at each of said locations axially clamping said flange member to said housing member with a predetermined force, and means on said flange member intermediate said locations in radial contact with said housing member to provide correct relative radial positioning of said members.

4. A substantially tubular machine housing member, and a pair of end flange members arranged respectively at the ends of said housing member in axial contact therewith at a predetermined number of locations in excess of two, said flange member being axially spaced from said housing member intermediate said locations, through-bolt means respectively axially securing together said flange members at each of said locations with a predetermined force, and means on said flange members respectively in radial contact with said housing member to provide correct relative radial positioning of said members.

5. A substantially tubular machine housing member, and a pair of end flange members respectively arranged at the ends of said housing member, each of said flange members having four equispaced indentations formed adjacent its periphery, each of said indentations forming a foot on the opposite sides of said flange member, each said foot being in axial contact with an end of said housing member, each said flange member being axially spaced from said housing member intermediate said indentations, four through-bolts each arranged axially to secure said flange members together at one of said indentations with a predetermined force, and axially extending members spaced around each of said flange members adjacent their peripheries intermediate said indentations in radial contact with the inner surface of said housing member to provide correct relative radial positioning of said members.

References Cited in the file of this patent
UNITED STATES PATENTS

| | | |
|---|---|---|
| 2,464,017 | Berghorn | Mar. 8, 1949 |
| 2,513,271 | Bluemink | July 4, 1950 |